United States Patent [19]

Schnell

[11] 4,276,687

[45] Jul. 7, 1981

[54] METHOD OF WINDING CAPILLARY FIBER BUNDLES

[75] Inventor: William J. Schnell, Wheeling, Ill.

[73] Assignee: Baxter Travenol Laboratories, Inc., Deerfield, Ill.

[21] Appl. No.: 41,112

[22] Filed: May 21, 1979

[51] Int. Cl.³ .................... B65H 54/02; B65H 54/28
[52] U.S. Cl. ...................................... 29/407; 29/411; 29/157 R; 156/171; 156/173; 242/18 G; 242/157 R
[58] Field of Search ............... 156/169, 425, 171, 172, 156/175, 296, 250, 441, 433; 242/702, 157 R, 18 G, 18 R, 43 R, 157.1, 53; 83/18; 210/321 R, 321 B, 321 A; 29/423, 157, 407, 411; 53/436, 435, 522, 528

[56] References Cited

U.S. PATENT DOCUMENTS

| | | | |
|---|---|---|---|
| 2,438,156 | 3/1948 | Dodge | 156/72 |
| 2,695,141 | 11/1954 | Rassey | 242/157 R |
| 4,070,785 | 1/1978 | Hawk | 242/157 R |
| 4,077,578 | 3/1978 | Cromie et al. | 242/43 R |

Primary Examiner—Michael W. Ball
Attorney, Agent, or Firm—Paul C. Flattery; Garrettson Ellis

[57] ABSTRACT

Capillary fiber bundles of semipermeable membrane material may be used by winding the fibers onto a reel member to form an annular assembly of the fibers, and thereafter cutting the annular assembly into separate bundles. In accordance with this invention, the capillary tubing is fed to the reel through guide slot means elongated in a direction generally parallel to the axis of rotation of the reel. The tension on the capillary tubing is sufficiently low to allow the capillary tubing to move about while winding in the guide slot means in generally random manner. Accordingly, the bundles comprise strands in generally non-parallel, crossing arrangement with adjacent strands. Individual bundles may be wrapped in a special flexible sheet, and cut at their ends for improved quality.

10 Claims, 7 Drawing Figures

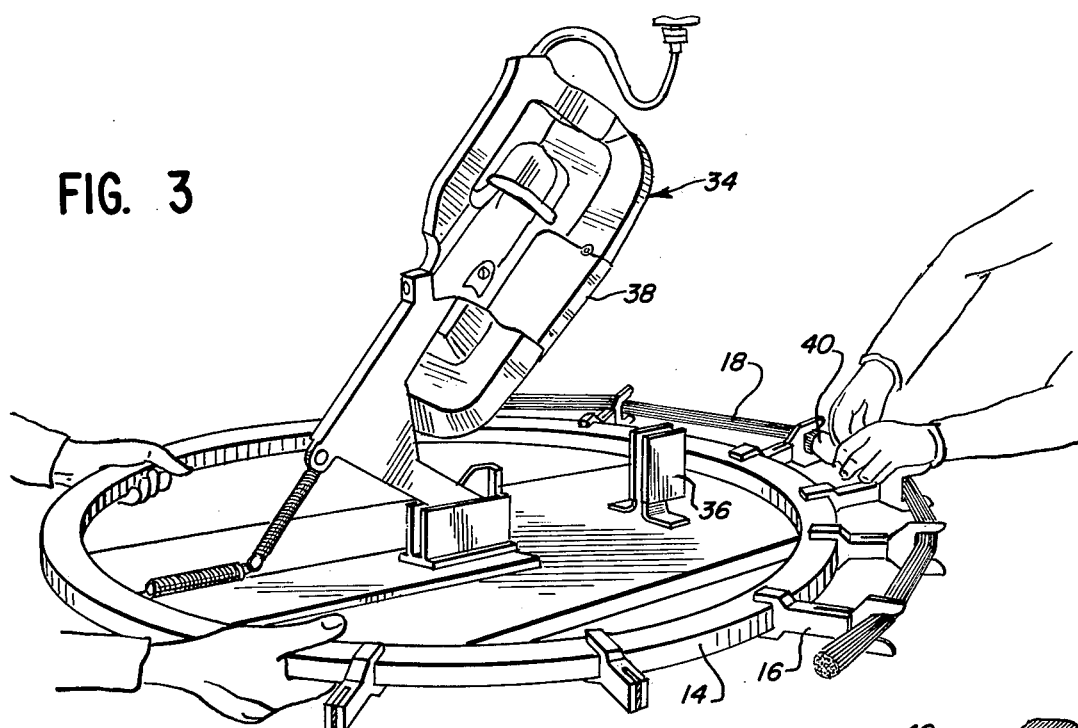
FIG. 3
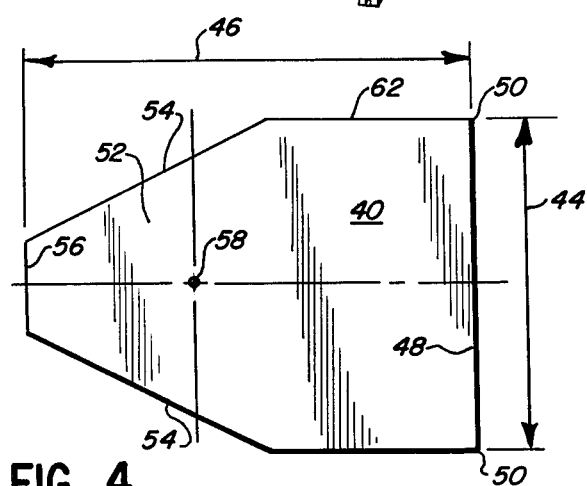
FIG. 4
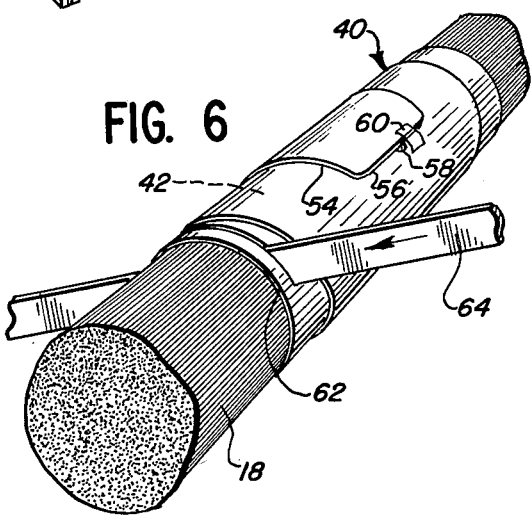
FIG. 6
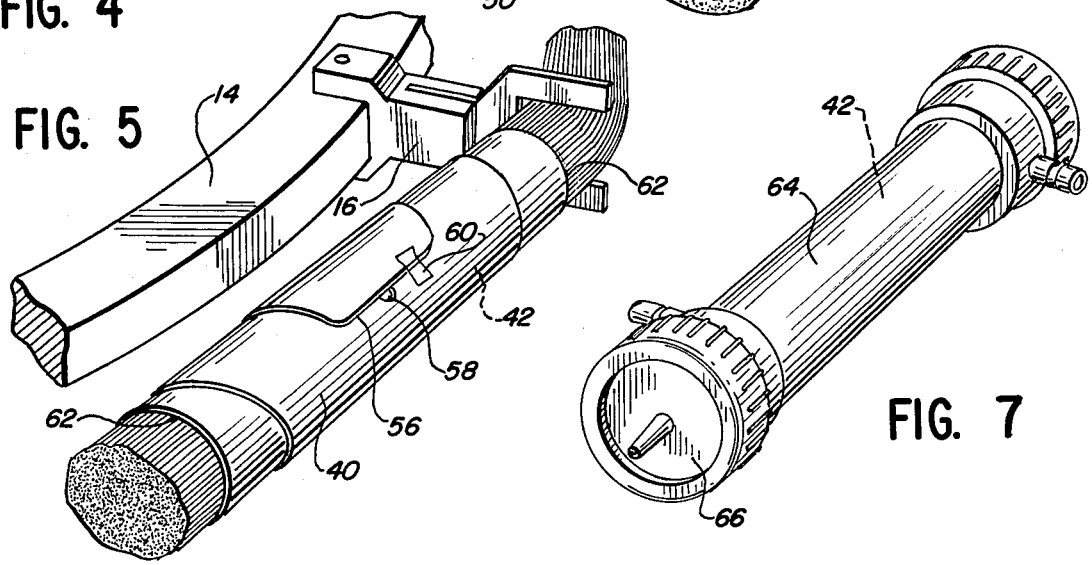
FIG. 5
FIG. 7

METHOD OF WINDING CAPILLARY FIBER BUNDLES

BACKGROUND OF THE INVENTION

In U.S. applications Ser. No. 658,143, filed Feb. 13, 1976 and Ser. No. 767,711, filed Feb. 11, 1977, a winding apparatus for tubular capillary fibers is shown. The fibers are wound on a reel to create a circular bundle of the wound fibers, which bundle is then enclosed in a "clam shell" type rigid temporary housing, with the individual enclosed bundles being then cut away from the fibrous bundle loop. A reciprocating arm guides the fibers back and forth across the width of the bundle as they are wound onto the bundle, for improvement of the dialysis characteristics of dialyzers made with the fiber bundles.

In this invention, a tubular hollow fiber bundle can be prepared which has improved advantages of manufacture and performance as a dialyzer. The rate of defective bundles which are produced is substantially less than in prior art techniques, while improved performance of the dialyzer is also noted after installation of the completed bundle into a housing to form a dialyzer, particularly the dialyzer for blood. In particular, improved performance can be obtained for several reasons, including the improved, smooth cut of the ends of the bundle which are provided in accordance with this invention.

DESCRIPTION OF THE INVENTION

In this invention, bundles of tubular capillary fibers of semipermeable membrane material for use in a membrane diffusion device may be provided by winding the capillary fibers onto a reel member to form an annular assembly of the fibers. Thereafter, the annular assembly may be cut into separate bundles.

In accordance with this invention, the capillary fibers are fed to the reel, typically off of spools, through guide slot means elongated in a direction generally parallel to the axis of rotation of the reel, and at a tension on the capillary fibers sufficiently low to allow the capillary fibers to move about while winding in the guide slot means in generally random manner.

As a result of this, the bundles comprise fibers in generally non-parallel, crossing arrangement with adjacent fibers.

Typically, the guide slot means is of essentially the width of the reel member and the annular assembly of fibers so that the generally random deposition of the fibers onto the bundle extends from side to side thereof.

It is also preferred to simultaneously wind a plurality of strands of capillary fibers from spools onto the reel member through a plurality of guide slots of the guide slot means.

Prior to the cutting step, it is preferable for the bundles to be wrapped in a flexible sheet which is typically paper. Thereafter, the bundles are cut through the wrapped paper sheet to obtain an improved cut of the bundle ends.

A specific wrapped paper sheet which may be used defines an inner end portion, positioned against the bundle, which is of rectilinear shape. An outer end portion of the paper sheet, opposed to the inner end portion, defines sides which taper inwardly towards the outer end, so that the sheet may be of the shape of an asymmetric hexagon having two adjacent 90° corners.

Marker means are provided on the paper sheet, spaced from the middle of the sheet toward the outer end. Accordingly, the compression of the wrapped bundle by the paper sheet may be predetermined by placing, in the wrapping process, the outer end of the wrapped sheet on the marker means, to predetermine and control the amount of compressive pressure on the bundle.

The tapering ends of the paper sheet facilitate twisting while wrapping of the paper sheet around the bundle, to obtain the desired, predetermined compression.

Referring to the drawings,

FIG. 3 is a perspective view of the reel mechanism used herein after winding, with portions broken away for purposes of clarity and convenience, with the reel being removed from its hub and positioned horizontally, and with one portion of the annular assembly of fibers being wrapped with the flexible sheet as described herein.

FIG. 4 is a plan view of one embodiment of the flexible sheet used in this invention.

FIG. 5 is a fragmentary, perspective view showing the flexible sheet in wound condition about the annular assembly of fibers.

FIG. 6 is a fragmentary perspective view showing the step of cutting the ends of the bundle through lateral portions of the flexible sheet.

FIG. 7 is a perspective view of a dialyzer comprising a housing which, in turn, contains the bundle of this invention.

Figure 1:
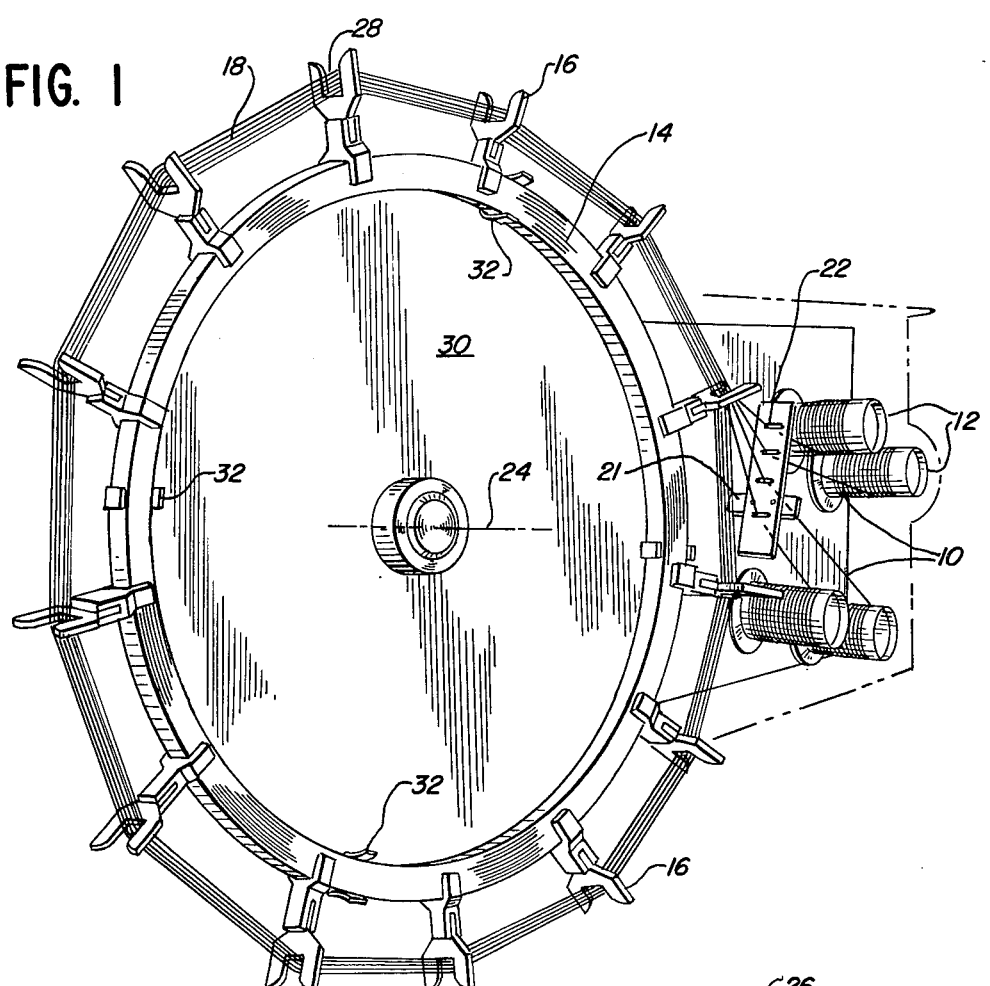
FIG. 1 is a perspective view of the winding apparatus used in accordance with this invention.
Figure 2:
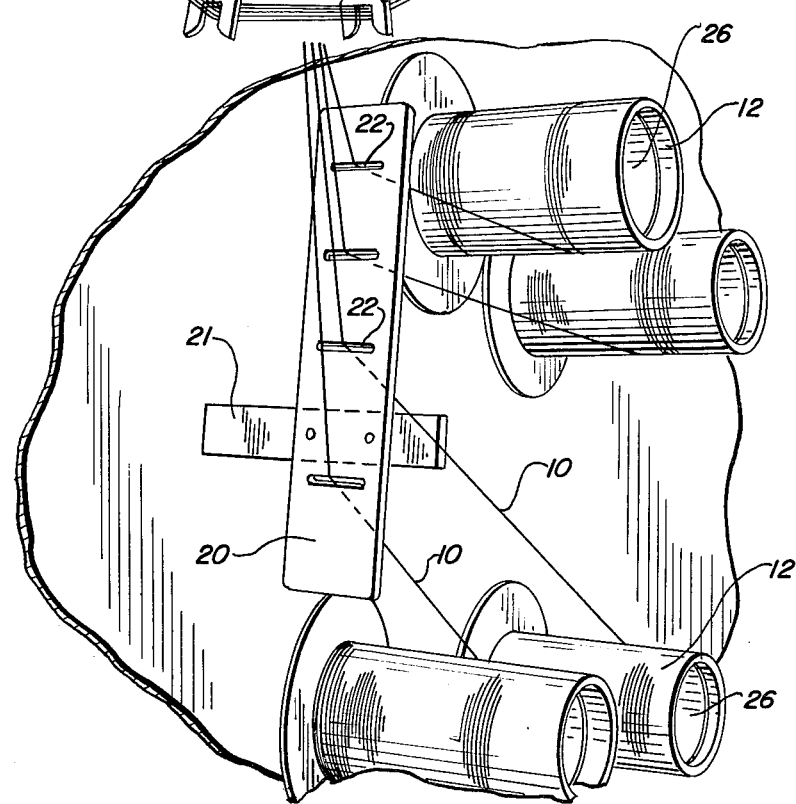
FIG. 2 is a fragmentary, perspective view of the reel-finding mechanism, showing the guide slot means.

Referring to the drawings, the bundles of this invention may be made by winding tubular capillary fibers 10, made, for example, of Cuprophan-type cellulose, off of a series of spools 12 onto a reel member 14, which comprises in the specific embodiment thirteen fork members 16 mounted on the periphery of reel 14, for receiving the fibers and holding them as an annular assembly 18 of capillary fibers is formed.

The plurality of fibers 10 each pass through guide slot means 20 carried by bracket 21 and comprising a plurality of guide slots 22, which can be seen to be each elongated in the direction which is generally parallel to the axis of rotation 24 of reel 14. Spools 12 of capillary fiber material may simply rest loosely on spindles 26 if desired, so that there is essentially no drag or tension on the capillary fibers 10 as they are paid off of the spools 12 and wound onto reel 14. As a result of this, as the reel can briskly rotate at a rate of preferably 100 to 200 rpm., and specifically 160 rpm., the spools 12 carrying fibers 10 freely unwind, causing the fibers 10 to move about or oscillate, while running through the guide slots 22, in a generally random manner. As a result of this, the annular assembly of fibers 18, and accordingly, the bundles ultimately formed therefrom, comprise fibers in generally non-parallel, crossing arrangement with adjacent fibers.

Preferably, guide slots 22 are of essentially the width of the reel member 14 and the annular assembly 18 being formed thereon. The width of recesses 28 in forks 16 also generally corresponds to this dimension.

After the winding step has taken place, reel 14 may be removed from rotary hub member 30 upon which it is carried, by sliding it out of clamps 32 or other desired means for attaching the circular removable reel 14 to the rotary hub member 30. Then, as shown in FIG. 3, reel 14 may be placed horizontally about a band saw 34, which is adapted to pivot downwardly to bring the band saw blade into support 36, which comprises a pair of plates as shown, with the band saw blade 38 fitting between the plates. The various fiber bundles may be separated from an annular assembly 18 by simply placing the annular assembly on top of support 36, for desired positioning, and bringing down the band saw 34, for sequential cutting of the various bundles apart.

Prior to this rough cutting step, a flexible, paper sheet 40, which is preferably made of polypropylene paper, is wrapped about the section of the annular assembly which is about to be cut away to form an individual bundle 42 of fibers. As shown, sheet 40 may desirably be about 11 inches wide at dimension 44 and about 15 inches long at dimension 46, for the specific wrapping of bundles of a normal size for use in generally conventionally sized capillary fiber dialyzer housings.

Paper sheet 40 is wrapped in a coil around bundle 42, as shown in FIG. 3, so that its inner end 48 which is positioned against the bundle 42, is the end as shown which is of rectilinear shape, with a pair of 90° angle corners 50. Outer end portion 52, which is opposed to the inner end 48, defines sides 54 which taper inwardly toward outer end 56, so that the width of outer end 56 is preferably less than half the width of inner end 48, and preferably about 20 to 40 percent of the width of inner end 48.

Marker means 58 are positioned on the flexible sheet, being spaced from the middle of the sheet toward outer end 56. In the specific embodiment shown, marker means 58 is simply a hole in sheet 40, which can be punched simultaneously with the cutting of the sheets to shape. However, ink markings or other indicia can also be used as desired.

The purpose of the marker means 58 is to serve as an indicator of the compression of the wrapped bundle, so that the compression may be predetermined in the wrapping process by placing the outer end 56 of the wrapped sheet on the marker means. This is accomplished by beginning to wrap sheet 40 about annular assembly 18, starting with inner end 48, and coiling the sheet about the annular assembly 18 as shown. The tapering sides 54 facilitate the coiling and compressive narrowing of the coiled sheet 40, to place pressure upon bundle 42 by tightening the coil until the outer end 56 of coiled sheet 40 overlies the marker means 58 as shown in FIG. 5. At this point, the bundle 42 is under a predetermined compressive pressure produced by sheet 40, which is essentially uniform from time to time, assuming that the winding conditions are kept the same, and that the same size and shape of sheet 40 is used in every case. The desired amount of compression is controlled by placement of the indicator means 58. The wound configuration may be retained by a simple piece of tape 60.

After this has been done, the previously described rough cut may be made outside of the edges 62 of paper sheet 40 by means of band saw 30, to separate bundle 42 from the remainder of the annular assembly 18. Thereafter, a fine cut may be made with a blade 64 or other means as desired, for example, a rotating band blade, cutting the bundle within the edge 62 of wrapped paper sheet 40, as shown in FIG. 6. The compressive pressure of sheet 40 provides improvement in the fine cut of the bundle.

The wrapped bundles may then be cleaned by washing in a solvent such as Freon type fluorochlorocarbon solvent, to remove any solvent such as isopropyl myristate which may be in the bores of the tubing. When sheet 40 is made of polypropylene paper, it resists degradation by the Freon solvent.

After drying, the wrapped bundles may be passed into the open end of a tubular housing 64, after which the paper wrapping may be pulled out, leaving the fibers intact in the housing 64. The ends of the bundle 42 in housing 64 may then be conventionally potted and otherwise treated in accordance with know techniques, following which conventional end caps 66 may be installed to provide a dialyzer as shown in FIG. 7.

The above has been offered for illustrative purposes only, and is not intended to limit the invention of this application, which is as defined in the claims below.

That which is claimed is:

1. The method of making bundles of tubular capillary fibers of semipermeable membrane material for use in a membrane diffusion device by winding said capillary fibers onto a reel member to form an annular assembly of said fibers, and thereafter cutting said annular assembly into separate bundles, the improvement comprising, in combination:

feeding said capillary fibers to said reel through guide slot means elongated in a direction generally parallel to the axis of rotation of said reel and of essentially the width of said annular assembly, at a tension on said capillary fibers sufficiently low to allow said capillary fibers to move laterally about while winding in said guide slot means in generally random manner, whereby said bundles comprise fibers in generally non-parallel, crossing arrangement with adjacent fibers.

2. The method of claim 1 in which a plurality of strands of capillary fibers are simultaneously wound from spools onto said reel member through a plurality of guide slots of said guide slot means.

3. The method of claim 2 in which, prior to said cutting of the annular assembly into separate bundles, the bundles are wrapped in flexible sheets, and thereafter the bundles are cut through said wrapped sheets, whereby an improved cut of the bundle ends is obtained.

4. The method of claim 3 in which said paper sheet is made of polypropylene paper.

5. The method of claim 3 in which said wrapped sheet defines an inner end portion, positioned against said bundle, of rectilinear shape, and an outer end portion, opposed to said inner end portion, defining sides which taper inwardly toward the outer end, and marker means on said flexible sheet spaced from the middle of said sheet toward said outer end, whereby the compression of said wrapped bundle may be predetermined by placing, during the wrapping process, the outer end of said wrapped sheet on the marker means.

6. The method of making bundles of tubular capillary fibers of semipermeable membrane material for use in a membrane diffusion device by winding said capillary fibers onto a reel member to form an annular assembly of said fibers and thereafter cutting said annular assembly into separate bundles, the improvement comprising, in combination:

feeding said capillary fibers to said reel through guide slot means elongated in the direction generally parallel to the axis of rotation of said reel, said guide slot means being of essentially the width of said annular assembly, at a tension on said capillary fibers sufficiently low to allow said capillary fibers to move laterally about while winding in said guide slot means in generally random manner, whereby said annular assembly comprises loops of strands in generally non-parallel, crossing arrangement with adjacent strand loops; wrapping portions of said annular assembly in flexible sheets; and thereafter cutting individual fiber bundles out of said strand loops, making said cuts through the wrapped sheets, whereby individual bundles having an improved cut of the bundle ends are obtained.

7. The method of claim 6 in which said sheet is made of polypropylene paper.

8. The method of claim 7 in which said wrapped paper sheet defines an inner end portion, positioned against said bundle, of rectilinear shape, and an outer end portion, opposed to said inner end portion, defining sides which taper inwardly toward the outer end, and marker means on said paper sheet positioned centrally on said sheet and spaced from the middle of said sheet toward said outer end, and predetermining the compression of said wrapped bundle by placing, in the wrapping process, the outer end of said wrapped sheet on the marker means.

9. The method of claim 8 in which a plurality of strands of capillary fibers are simultaneously wound from spools onto said reel member through a plurality of guide slots of said guide slot means.

10. The method of claim 9 in which said wrapped bundle is washed in a Freon-type fluorochlorocarbon solvent.

* * * * *